(12) United States Patent
Maim

(10) Patent No.: US 12,111,917 B2
(45) Date of Patent: Oct. 8, 2024

(54) TERMINALS AND METHODS FOR SECURE TRANSACTIONS

(71) Applicant: Enrico Maim, Sceaux (FR)

(72) Inventor: Enrico Maim, Sceaux (FR)

(73) Assignee: Enrico Maim, Feusisberg (CH)

( * ) Notice: Subject to any disclaimer, the term of this patent is extended or adjusted under 35 U.S.C. 154(b) by 51 days.

(21) Appl. No.: 16/765,111

(22) PCT Filed: Nov. 15, 2018

(86) PCT No.: PCT/IB2018/059003
§ 371 (c)(1),
(2) Date: May 18, 2020

(87) PCT Pub. No.: WO2019/097450
PCT Pub. Date: May 23, 2019

(65) Prior Publication Data
US 2020/0349253 A1    Nov. 5, 2020

(51) Int. Cl.
*G06F 21/55* (2013.01)
*G06F 21/60* (2013.01)
*G06F 21/87* (2013.01)
*H04L 9/40* (2022.01)
*H04W 12/041* (2021.01)
*H04W 12/50* (2021.01)
(Continued)

(52) U.S. Cl.
CPC ............ *G06F 21/55* (2013.01); *G06F 21/606* (2013.01); *G06F 21/87* (2013.01); *H04L 63/14* (2013.01); *H04L 63/20* (2013.01); *H04W 12/041* (2021.01); *H04W 12/50* (2021.01); *H04W 12/63* (2021.01); *G06F 2221/034* (2013.01); *H04L 63/0435* (2013.01); *H04W 4/80* (2018.02)

(58) Field of Classification Search
CPC ..... G06F 21/55; G06F 21/87; G06F 2221/034
See application file for complete search history.

(56) References Cited

U.S. PATENT DOCUMENTS

| | | | |
|---|---|---|---|
| 5,049,855 A * | 9/1991 | Slemon | G08B 13/126 |
| | | | 250/227.28 |
| 9,059,189 B2 | 6/2015 | Keller, III et al. | |
| 9,455,233 B1 | 9/2016 | Bhooshan et al. | |

(Continued)

FOREIGN PATENT DOCUMENTS

| | | |
|---|---|---|
| EP | 1273997 A2 | 1/2003 |
| WO | 2016/120826 A2 | 8/2016 |

(Continued)

OTHER PUBLICATIONS

International Preliminary Report on Patentability received for PCT Patent Application No. PCT/IB2018/059003, mailed on May 28, 2020, 18 pages (9 pages of English Translation and 9 pages of Original Document).

(Continued)

*Primary Examiner* — Catherine Thiaw
*Assistant Examiner* — Zhe Liu

(57) ABSTRACT

A portable terminal includes a security envelope, the envelope being able to capture a signal transmitted by a generator of the terminal (screen, loudspeaker, etc.), to convey this signal and to restore it at the level of a sensor of the terminal (camera, microphone), so as to be able to detect a breach of this envelope by alteration of the restored signal.

3 Claims, 3 Drawing Sheets

(51) Int. Cl.
H04W 12/63 (2021.01)
H04W 4/80 (2018.01)

(56) References Cited

U.S. PATENT DOCUMENTS

| | | | |
|---|---|---|---|
| 9,589,405 B2* | 3/2017 | Cabouli | H04W 12/50 |
| 9,661,747 B1 | 5/2017 | Brodsky et al. | |
| 9,979,427 B2* | 5/2018 | Thomas | H04B 1/3888 |
| 10,437,988 B1* | 10/2019 | Newstadt | G06F 21/52 |
| 2003/0009683 A1 | 1/2003 | Schwenck et al. | |
| 2007/0175023 A1 | 8/2007 | Heitmann et al. | |
| 2007/0234058 A1 | 10/2007 | White | |
| 2008/0192240 A1* | 8/2008 | Tucker | G01M 11/3109 356/73.1 |
| 2011/0260749 A1 | 10/2011 | Deas et al. | |
| 2011/0267190 A1 | 11/2011 | Payson et al. | |
| 2011/0285420 A1 | 11/2011 | Deas et al. | |
| 2011/0285421 A1 | 11/2011 | Deas et al. | |
| 2013/0024952 A1* | 1/2013 | Sivertsen | G08B 13/181 726/34 |
| 2013/0104252 A1 | 4/2013 | Yanamadala et al. | |
| 2014/0006277 A1* | 1/2014 | Rao | G06Q 20/3572 705/41 |
| 2014/0111334 A1* | 4/2014 | Carpenter | G08B 13/14 248/689 |
| 2014/0283146 A1* | 9/2014 | Obukhov | G06F 21/87 726/34 |
| 2014/0380445 A1* | 12/2014 | Tunnell | H04L 63/18 726/7 |
| 2015/0097572 A1 | 4/2015 | Wade et al. | |
| 2016/0026275 A1* | 1/2016 | Barrowman | G06F 21/87 726/34 |
| 2016/0225293 A1* | 8/2016 | Basset | B65D 55/066 |
| 2016/0234356 A1* | 8/2016 | Thomas | H04K 3/84 |
| 2016/0307412 A1* | 10/2016 | Lewis | G06K 19/07345 |
| 2016/0379220 A1* | 12/2016 | Tunnell | H04W 12/068 705/71 |
| 2017/0011667 A1* | 1/2017 | Sanchez | A61J 1/03 |
| 2017/0091750 A1 | 3/2017 | Maim | |
| 2017/0116440 A1* | 4/2017 | Huang | G06F 21/87 |
| 2017/0124356 A1* | 5/2017 | Allyn | H04L 9/3297 |
| 2017/0135237 A1 | 5/2017 | Brodsky et al. | |
| 2017/0332485 A1* | 11/2017 | Busby | G06F 21/87 |
| 2018/0060613 A1* | 3/2018 | Breed | H01L 23/573 |
| 2019/0236591 A1* | 8/2019 | Iaremenko | H04L 9/0877 |

FOREIGN PATENT DOCUMENTS

| | | |
|---|---|---|
| WO | 2017/050910 A1 | 3/2017 |
| WO | 2017/122187 A2 | 7/2017 |

OTHER PUBLICATIONS

International Search Report and Written Opinion received for PCT Patent Application No. PCT/IB2018/059003, mailed on Apr. 17, 2019, 23 pages (10 pages of English Translation and 13 pages of Original Document).
Office Action received for European Patent Application No. 18826442.8, mailed on Nov. 23, 2021, 5 pages.
U.S. Appl. No. 62/400,174, filed Sep. 27, 2016.
U.S. Appl. No. 62/430,506, filed Dec. 5, 2016.
U.S. Appl. No. 62/462,390, filed Feb. 23, 2017.

* cited by examiner

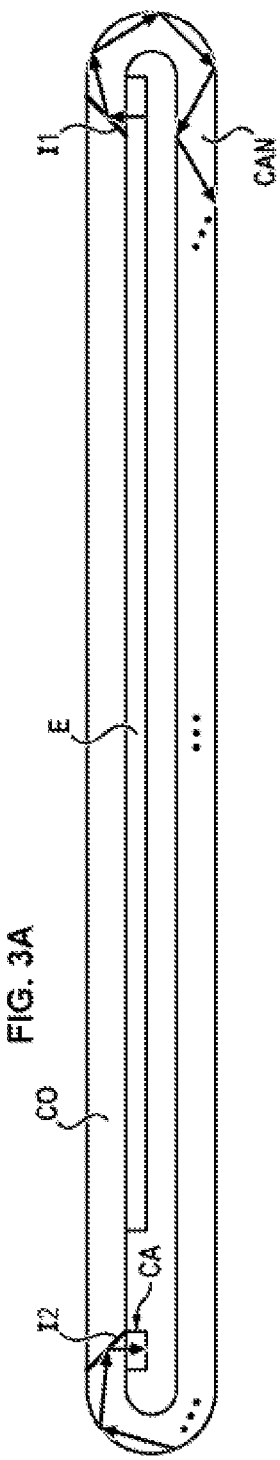
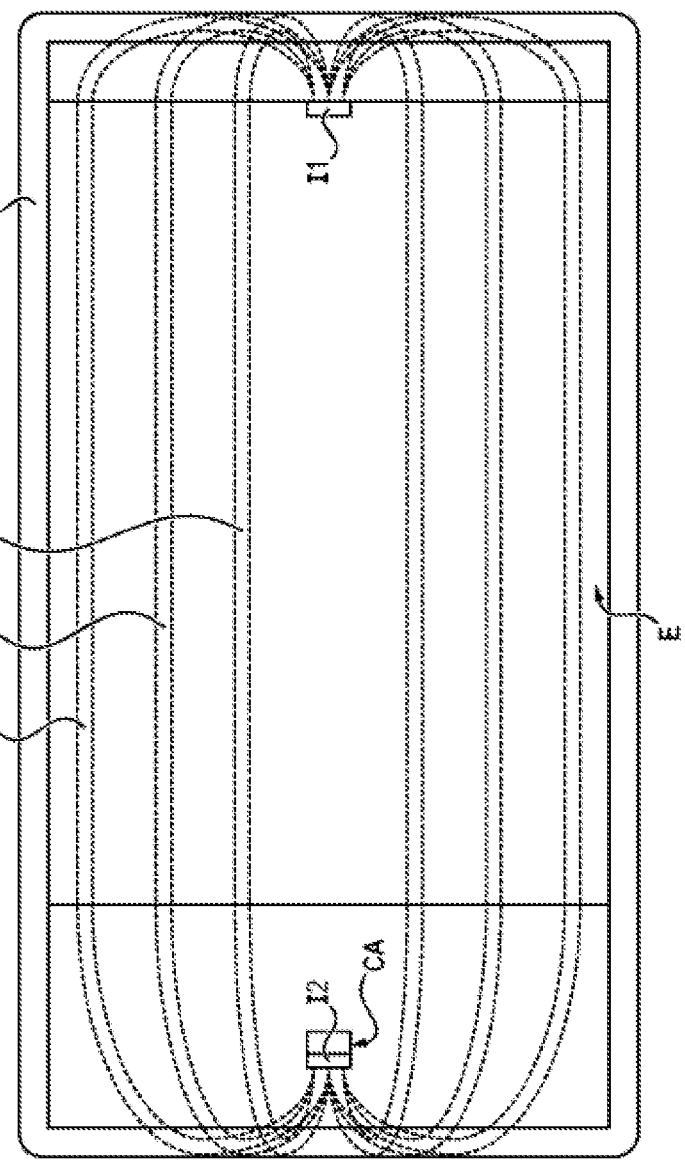

TERMINALS AND METHODS FOR SECURE TRANSACTIONS

FIELD OF THE INVENTION

The invention relates to the field of particularly transactional methods and systems involving secure devices, and in particular but not limited to systems and methods as described in documents WO2016120826A2 and WO2017122187A2 in the name of the applicant, the contents of which are incorporated into this description by reference.

BACKGROUND OF THE INVENTION

The search reports drawn up for the two aforementioned documents constitute the closest state of the art.

SUMMARY OF THE INVENTION

According to a first aspect, a portable terminal comprising a security envelope is provided, the envelope being capable of capturing a signal transmitted by a generator of the terminal, in particular a screen or speaker, to convey this signal and to restore it at the level of a terminal sensor, in particular a camera or microphone, so as to be able to detect a breach of this envelope by alteration of the restored signal.

Advantageously, the envelope forms a plurality of channels capable of conveying the signal, distributed in the envelope.

A second aspect provides a method for securing interactions between devices, comprising a step of initial pairing of the devices, said pairing step comprising the transmission of a normal envelope signal for a first device to a second device (and possibly reciprocally) and a subsequent step of interaction between the first and second devices, said interaction step comprising the transmission by the first device to the second device of its current envelope signal, and the verification at level of the second device that the current envelope signal received from the first device conforms to its normal envelope signal (and possibly reciprocally).

Advantageously, the pairing comprises at least one technique chosen from an exchange of biometric data, an exchange of random codes generated at the level of each device, the generation of a common physical signal (e.g., shock), and in which normal envelope signals are exchanged during pairing.

Another aspect provides a method for determining the origin of fraud in a network of communicating devices where each device has a security envelope and a means of detecting fraud on this envelope, the method comprising the following steps:
- the determination of a logic type fault on the behavior of a first device (abnormal output);
- the determination of a breach of the security envelope of the first device,
- the neutralization of the first device in the event of a break-in on its envelope,
- the propagation of fault information from the first device to the network in the event of a logic type fault without break-in.

Advantageously, the method further comprises, in addition to the determination of a breach of the envelope, the determination of a fault on a sensor and/or actuator block of the first device, and the neutralization of the first device in the event of an enclosure intrusion or a fault in the sensor and/or actuator block.

According to another advantageous aspect, this method comprises, during neutralization, taking into account device manufacturer information with a view to neutralizing all of the devices from said manufacturer.

According to yet another aspect, a method of pairing between devices at several levels is provided, with a direct pairing (level 0) requiring proximity between devices and an indirect pairing where devices already paired with a second device become indirectly paired (levels 1 and more) with the first device by entourage transfer when the first and second devices are the subject of a direct pairing, and at least some devices being protected by an envelope secured by means for detecting an intrusion of the envelope and to transmit envelope breaking information to other devices, in which only a device protected by a secure envelope can transmit an environment to another device.

Advantageously, only an entourage meeting a given criterion in terms of population of devices protected by a secure envelope can be transferred to a device within the framework of a direct pairing.

According to another advantageous aspect, direct matching involves biometric data, said biometric data being used to limit the possible number of pairs of public/private keys per individual in the network.

An additional aspect provides a method of pairing between devices capable of transmitting and receiving coding signals transmitted in proximity, a first device transmitting a signal coding a nonce picked up by the second device while simultaneously the second device transmits a signal. encoding a second nonce received by the first device, said nonces being used to generate a common ephemeral symmetric key to secure the exchange between the devices of other data linked to the pairing.

Another additional aspect provides a method of pairing between devices capable of transmitting and receiving coding signals transmitted in proximity, a first device transmitting a signal coding a nonce picked up by the second device while simultaneously the second device transmits a signal encoding a second nonce received by the first device, said nonces being used to reciprocally transmit their public keys to secure the exchange between the devices of other data linked to the pairing.

BRIEF DESCRIPTION OF THE DRAWINGS

Other aspects, aims and advantages of the invention will appear better from the attached Figures.

FIGS. 3A and 3B illustrate in cross section and in plan view a smartphone-type terminal equipped with some form of secure envelope.

The drawings in WO2016120826A2 and WO2017122187A2 as well as the other applications mentioned in chapter VI below are to be considered as part of the present drawings.

DETAILED DESCRIPTION OF PREFERRED EMBODIMENT FORMS

I—Envelope Signature

Now will be described a certain number of possible embodiments for a device for protection against physical attacks on a circuit having its own logic protection (for example "Trusted Execution Environments" (TEE) or "Wallet Node Devices" such as described in WO2017122187A2), intended to provide one or more functions or transactions in a secure manner, or any combination of circuits to be secured.

Figure 1:
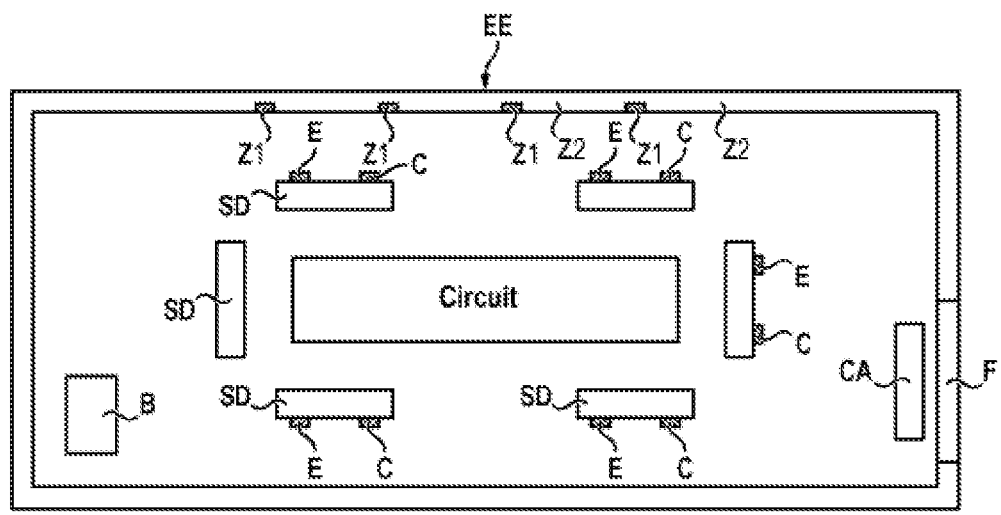
FIG. 1 is a diagrammatic view in cross section of a circuit equipped with a secure envelope and of break-in detection means.

In a first approach, and with reference to FIG. 1, the device implements an outer casing EE preferably essentially continuous, surrounding the circuit to be protected and having certain unique properties.

These unique properties can be materialized for example by:
- the presence in certain zones Z1, in the mass or in coating, of a certain material different from the material of the other zones Z2, this different material being able to be detected in particular by its properties in response to a certain radiation;
- in a concrete embodiment of the above principle, the presence of a single optically readable pattern, the material typically being an ink;
- the presence in certain areas of a surface treatment (roughness, etc.), this treatment being able to be detected in particular by its properties in response to a certain radiation.

This pattern can be predefined or generated randomly, so as to be unique to a given circuit.

By radiation is meant here preferably an electromagnetic radiation going from radio waves to waves in the visible range and even up to infrared.

However, certain embodiments, in particular when the size of the envelope increases, can involve acoustic waves, for example ultrasound.

The treatment of the shell material exposed to this radiation is determined according to the nature and the wavelength of the radiation: for example, metallized areas vs. non-metallic, reflective vs. absorbent, reflective vs. diffusing.

Furthermore, the envelope, intrinsically or by virtue of a specific treatment subsequent to its manufacture, may include windows F, namely zones transparent with respect to such a type of radiation, allowing in particular sensors (sensor optics such as a CA or other camera, antenna, sound or ultrasonic sensor, etc.) to be able to pick up the radiation in question coming from the outside, and/or in particular allowing sources of such radiation to transmit to the outside.

The device further comprises an internal detection structure SD in one or more parts extending inside the envelope EE and capable of scanning this envelope and of generating a signal intended to be signed with a private key of the circuit for testify to the non-alteration of the envelope.

This detection structure comprises in one embodiment a circuit having one or more radiation transmitters E in combination with one or more sensors C, organized for example in a matrix or in a modular fashion, allowing this circuit being able to communicate in a secure manner with a cryptographic part of the circuit to be protected, which will carry out the signature on the signal supplied with the aforementioned private key.

The device is supplied either by a dedicated battery B housed inside the envelope, or by the battery, also internal, which supplies the circuit C.

In a particular embodiment, the transmitters transmit signals which are reflected or diffused or absorbed by the different materials or coating on the internal face of the envelope, and the sensors receive the return signals.

It is understood that a given pattern of the envelope E will correspond to a unique configuration of collected signals, and that if the pattern has been moved or altered, the collected signals will also be altered.

Preferably, in the case of several sensors, the signals generated at the output by these are combined (analog or digital combination, for example by multiplication, multiplexing, etc.), and the global signal formed (called the envelope signal), is signed using the private key of the circuit, to form a unique envelope signature (hereinafter ES) corresponding to an intact envelope.

In the case where the sensor or sensors deliver analog signals, there is associated therewith in a manner known per se processing means (amplification, filtering, etc.) and analog/digital conversion so as to obtain a digital signal.

This digital signal is subjected to a hash function, the hash is then encrypted with a private key of the circuit and stored (or dynamically regenerated by PUF process) in it inaccessible from the outside, to obtain the signature of envelope.

This private key is associated with a public key certified by the manufacturer of the circuit or of the entire device, this public key being able to be used by other devices to verify the origin and the hash of the envelope signal.

In another embodiment, the sensor or sensors directly deliver a digital signal, the digital signals of the different sensors being combined (for example concatenated), and the hash of this combination being encrypted with the private key as mentioned above to generate the envelope signature.

It should be noted that the pattern integrated into the envelope can be designed to make it possible to detect not only mechanical attacks on the envelope, inevitably inducing alteration or displacement of the pattern, but also attacks by attempting to read content through the envelope (for example Focused Ion Beam, etc.)

Also advantageously, the envelope also provides protection at the level of the supply conductors of the circuit, so as to avoid an attempted fraud involving a cut in the supply.

The detection structure includes its own drivers for the transmitter(s) and the sensor(s), and communicates with the circuit to be protected according to an appropriate protocol.

The envelope signal is generated either regularly at the initiative of the circuit to be protected or at the initiative of the detection structure SD (the latter then being sequenced by its own clock), or at the request of the circuit to be protected.

In one embodiment, the envelope signal can be combined with time stamp information before being signed.

In one embodiment, a log of the envelope signal-possibly time-stamped—is recorded in an ad hoc protected memory accessible by the circuit to be protected, the recording preferably taking place after signature.

It is possible to provide for an operation of the circuit to be protected in self-protection. In this case, said circuit is neutralized as soon as it has detected that the envelope signal has been altered by an intrusion attempt. The circuit can also send an alert message to one or more other devices, to add a degree of security in the event that the self-neutralization mechanism has been bypassed.

The recording of time stamped envelope signatures in a log also makes it possible to detect a temporary power cut in the circuit. Indeed, it will then be impossible to reconstruct a posteriori the previous time stamped envelope signal signatures.

In an alternative embodiment, the pattern "written" in the envelope may constitute an auxiliary memory for certain data relating to the circuit. For example, this pattern can also constitute an identifier of the circuit. In this case, the envelope signal constitutes a circuit identification signal.

In addition, the circuit to be protected can belong to a device in an environment where devices are paired with one another (for example SoCs or "Wallet Node Devices" as described in WO2016120826A2 and WO2017122187A2), for example by forming entourage (see below).

During pairing between devices, the respective envelope signatures are mutually communicated and stored, and it is expected that during subsequent interactions between paired devices, the envelope signatures will be transmitted again. A second device paired with a first device is therefore capable of determining, by comparison of the current hash with the hash communicated during pairing, that the envelope of the first device has not been altered, and vice versa.

On this occasion, if the envelope signal has been supplemented by time stamping information at the source device, the recipient device can also after decryption determine whether the time stamping information contained in the message in association with the envelope signal is normal.

Figure 2:
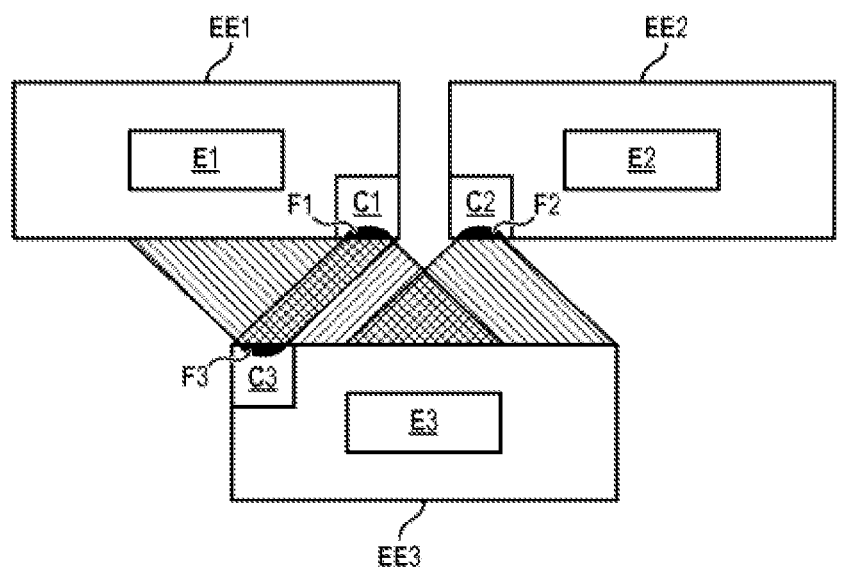
FIG. 2 is a block diagram of a set of circuits capable of mutually monitoring their secure envelopes.

The envelope signing mechanism as described above can be implemented in different ways:

it is thus possible to house in a single envelope an assembly constituted by a main circuit (implementing for example a WN wallet node) combined with one or more sensors and/or one or more actuators as described in patent application U.S. 62/430,506 filed on Dec. 5, 2016, and the content of which is incorporated herein by reference.

alternatively, and with reference to FIG. 2, each of these elements E1, E2, E3 may have its own envelope EE1, EE2, EE3 as described above. In this case, each element can monitor its own envelope from the inside, but each element can also have one or more sensors C1, C2, C3 operating through one or more windows respectively F1, F2, F3 of its own envelope and able to monitor the envelope of a neighboring element. An envelope will thus have a unique "internal" envelope signature, and one or more unique "external" envelope signatures established by elements (sensors, actuators, wallet node circuit, other circuits, etc.) located fixed in the vicinity.

Under these conditions, if an attempt is made to break into one of the elements, it would be necessary to simultaneously break into the neighboring element or elements which monitor the envelope of the element in question in order to neutralize them. This need to break into two or more elements of the same set simultaneously makes any fraud impossible.

Monitoring of a circuit envelope from the inside or outside can be supplemented by monitoring environmental parameters of the circuit in question or of its or its neighbors (temperature, clock frequency, etc.).

Other embodiments of a single signature envelope are possible.

1) Flexible Envelope

An envelope can be made of a thin material with a certain capacity for plastic deformation, its application around a circuit involving forces which lead it to adopt a unique geometric configuration for each circuit. The scale at which the shapes are different may vary. A detection structure based on the emission of radiation in the visible or near invisible range (UV for example) makes it possible to detect using appropriate optical or UV sensors (for example by detecting interference patterns) micrometric variations of the shape of the envelope, each envelope having a unique signature.

In a particular form, this envelope can be made of a deformable resin curable by UV, provided on its internal surface with a film in a thin layer, for example a metallic layer (ensuring at the same time an electromagnetic shielding) capable of reflecting the radiation transmitted towards it by the detection structure. Micrometric differences in the shape of the envelope and therefore of the thin layer will generate detection configurations by a set of optical sensors which are each time unique.

2) Other Approaches Drawn from Existing Art a) US Publication No. 2011/0267190 A1: a transmitter located internally to a security envelope of the circuit transmits an RF (radiofrequency) signature which is reflected by the internal face of said envelope, the reflected signal being picked up by a reception antenna: if the envelope has been altered, the reflected signal no longer conforms to the expected signal and a physical attack is thus detected;

b) U.S. Pat. No. 9,059,189 B1: integrated circuit with inside its housing a radiofrequency (RF) transmission/reception system capable of generating a specific signature in the temporal and frequency domains, with the RF signal and therefore the signature being altered in the event of abnormal conditions;

c) U.S. Pat. No. 9,455,233B1: a circuit is surrounded by a micro-grid of conductive wires which allows the detection of an attempted break-in by "micro-probing";

d) U.S. Pat. No. 9,661,747B1: flexible security envelope layer with patterns made with conductive ink, and associated detection means;

e) US Publication No. 2007/0175023 A1: flexible circuit packaging cooperating security "trace" layers having conductive patterns, for example serpentine;

f) US Publication No. 2007/0234058 A1: authentication of a product by comparison of a so-called "laser speckle" pattern with a reference pattern: if the product has been altered (counterfeit), the signature no longer corresponds;

g) US Publication No. 2013/0104252 A1 or US Publication No. 2016/0211843 A1: use of a trellis of conductive wires carrying a variable digital code;

h) US Publication No. 2015/0097572 A1: envelope provided with a network of conductors with variable contact configuration generated during manufacture, unique for each circuit;

i) US Publication No. 2017/0135237 A1: flexible envelope with conductive patterns and creation of overlapping zones when applied to a housing;

j) Patent WO2017050910A1: variable configurations of an array of electrically connected cells, each having a unique characteristic impedance;

k) an article located at http://www.informit.com/entitled: Practical Secure Hardware Design for Embedded Systems (Part 1 of 2), Aug. 6, 2004, Informit, which describes a certain number of techniques making it possible to avoid access (mechanical, electrical or optical) to a circuit to be protected.

3) Acoustic Approaches

It is possible to transpose the principles of certain patents above to the universe of acoustic waves (typically ultrasound), the envelope incorporating in this case channels capable of conveying the acoustic waves in a directional manner, and a break in the continuity of the envelope causing an interruption in the conduction of acoustic waves from a transmitter to a receiver.

4) Envelope for Commercial Device

The invention can also be implemented with electronic devices formed of devices such as smartphones.

In this case, a secure envelope surrounds at least part of the smartphone (in any case the part that would necessarily have to be opened to physically alter the content of the smartphone).

This envelope is designed to uniquely convey signals between a transmitter transmitted from the smartphone and a receiver also located in the smartphone.

For example, the shell can be arranged to be in acoustic communication with the speaker of the smartphone and with its microphone, and to convey in a unique way (for example with a unique frequency response profile, by choosing a configuration of material from the shell) a certain acoustic signal generated within the smartphone and transmitted by the loudspeaker, towards the microphone (the acoustic waves being propagated in the mass of the shell, for example in the form of surface waves).

If the signal picked up by the microphone does not have the expected characteristics, this means that either the shell has been removed, or it has been altered to access the interior of the smartphone.

A similar principle can be implemented with optical signals transmitted by the display screen of the smartphone (partially optically coupled with the shell) and collected by a camera of the smartphone (here again partially optically coupled with the shell.

An example of propagation of the optical signals in the shell is illustrated schematically in FIGS. 3A and 3B.

The shell CO includes within it an internal reflection interface I1 with regard to a particular area of the display screen E, and another internal reflection interface I2 with regard to a particular area of the CA camera. Thus it is possible to send, by controlling the display, an optical signal with intensity modulation and/or spectral variation over time (preferably a single signal for each smartphone), which propagates after internal reflection on I1 in the shell to the I2 interface and therefore to the CA camera.

This signal covers the entire periphery of the smartphone, for example being distributed in a set of optical CAN channels forming a network of parallel lines, a trellis, etc. If one of the channels is interrupted due to break-in on the shell, then the overall intensity received at the level of the camera is lowered, and/or the spectral characteristic of the received signal is altered, component, and this break-in is thus detected.

In the event that such a shell is accidentally fractured, the envelope signature is altered, and the circuit is no longer considered reliable. A new pairing with a new shell is then necessary.

II—Interactions Between Devices

Documents WO2016120826A2 and WO2017122187A2 describe in particular:

methods allowing a decentralized identity in a P2P network and

Wallet Node Device systems (hereinafter WND)—called Body SoC or Body Enclave in the first part of the text-hosting Wallet Nodes (WN) running Wallet Programs (WP, "smart contracts") on interaction protocols, in particular the transfer of tag-values—called Tags— (such as Bitcoins), between WN, implementing WND mirrors.

The methods and systems described in this part extend or are variants of those already described and aim to make them more reliable.

Here will be first described a new family of decentralized identification processes of nodes forming a peer-to-peer network, before describing the hardware means and a protocol to take advantage of (and encourage by creating a virtuous circle) the decentralization to the level of WND manufacturers.

Typically, each node locally generates (for example in the browser) a pair of cryptographic keys (private/public) and associates attributes (such as the name of the individual that the node represents) characterizing it. The keys are used to (i) identify the node, possibly by generating the address of the node on the network from the public key (typically, this is the hash (or the hash of the hash) of the public key) (ii) to encrypt the content transmitted (with the recipient's public key, the recipient decrypting it with his private key) and (iii) sign it (with the issuer's private key, the recipient verifying the signature with the public key of the transmitter).

1) Pairing-Exchange of Public Keys

To form a link in the network (i.e. to be "directly connected") two nodes (devices) must be paired, i.e., exchange their respective public keys, as well as attributes associated with each key, which are to be validated by the recipient node (the recipient thus recognizes the attributes associated with the key), using one protocol from a set of secure protocols which are available to them (depending on the technologies available in the devices-see the pairing procedures described below).

Note that the devices themselves must be logically secure-see the description of WNDs in the above applications on this subject.

This pairing is preferably done with protection against a "Man-in-the-middle (MitM) attack": it is preferably an exchange of public keys during a physical meeting, or remotely but specially secured. Note that below; when the transmission (or exchange) of public keys is mentioned, it is meant transmission (or exchange) of public keys or addresses. Note also that, although a link (of authentication) between two nodes is not necessarily bidirectional, below to facilitate the reading of the text only the exchanges of public keys are described in a bi-directional way—the processes described below can be executed in a uni-directional way (the reader can easily understand them in this sense).

These public keys thus exchanged make it possible to encrypt the attributes and thus transmit them in a secure manner (see also the protocols described below which also offer means of transmitting data encrypted by symmetric key). And the knowledge of public keys, and associated attributes, is thus propagated step by step (see the Entourage (Neighborhood) section of a node).

The verification of the authenticity of a received public key is carried out as follows.

First of all, it is already known how to verify that there has been no usurpation of digital identity: conventionally, a user A sends a nonce (random number for single use) to a user B: user B signs the nonce and this signature can be verified by A by decrypting it with the public key of B. This therefore makes it possible to eliminate a user B who would know the public key of B and would therefore attempt to usurp their digital identity.

Figure 4:
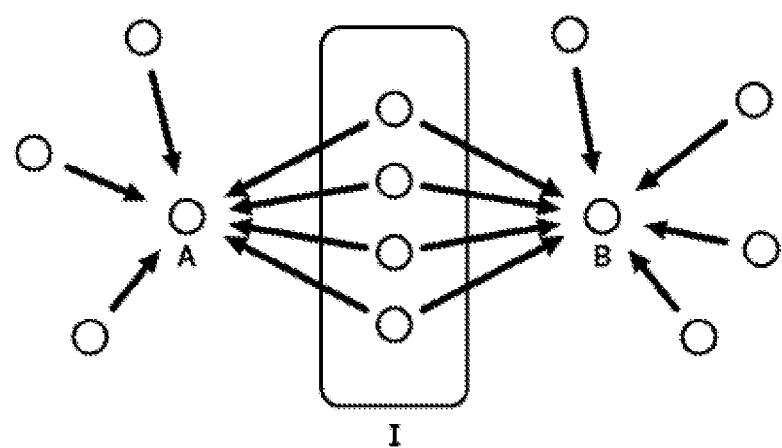
FIG. 4 illustrates a mutual authentication of nodes in a network with transmission of attributes.

Second, when a node transmits its attributes to another node, it receives in return a confirmation that indeed these attributes characterize it. Thus, for two nodes to authenticate each other, it suffices that they have confirmations of their attributes by a sufficient number of nodes in common. FIG. 4 shows that the nodes "A" and "B" authenticate each other because the intersection "I" of the respective sets of nodes from which they have received confirmation of their attributes is sufficiently large (this intersection includes 4 nodes in the figure-note that in general the exchanges and confirmations of attributes are done in both directions, but this is not shown in FIG. 4 to focus on the process in question). Advantageously, the node which authenticates will only accept in the set "I" the nodes of which it has itself confirmed attributes. Alternatively, this same approach can be used to implement authentication in each direction separately: thus to authenticate node "B" in the figure, node "A" must have confirmed the attributes of enough nodes (which can be seen here as forming the set "I" in the figure) which in turn confirmed the attributes of node B in the figure. In addition, methods for determining connection weights or attribute scores can be used, some of which are described in the first part of the text, these methods allow authentication in a broader way, the requirement of nodes in common (that is to say the intersection "I") being made less strict by also accepting a sufficient number of different nodes but strongly connected to each other or having high scores depending on the node which authenticates.

Finally, before accepting a new node in the network or in the event that there is not a sufficient number of confirmations by nodes in common (or strongly connected to each other), it is necessary to use a protocol such as those described below (and which are analogous to the "IRL-connection" process described at the beginning of the first part) to transmit the keys and attributes in a secure manner (to mitigate the risk of an MitM attack).

2) Pairing-Signal Capture and Return Locally

To further secure a pairing, techniques are provided here for capturing and returning signals randomly and locally generated on both sides by at least two devices (typically smartphones) which are in close physical proximity to each other (these signals can for example be a flash display of a certain optical pattern, for example a QR-Code, on a device and a snapshot of this pattern by the camera of the other device, mutually), the devices communicating then between them in encrypted form using these signals in order to mitigate the risk of MitM.

Advantageously, the method comprises a "handshaking" protocol for fixing the signal presentation/capture moment(s).

In the particular case of an embodiment exploiting optical signals, two devices provided with optical reading means (such as two smartphones, using a given app) coordinate according to an optical handshaking protocol (by displaying codes such as QR-Codes, according to predetermined rules, according to codes read from the other device), to determine the precise instant when they must take said snapshot, and present to each other (by flash display at this precise instant) an optical code generated randomly and being used only once, the devices having at this precise instant typically to be put in a predetermined position relative to the other (typically, each must face the other) so that the displayed code can be read completely.

Said captured code may alternatively consist of a sequence of optical signals.

Analogous methods can be implemented with signals of other types, for example coding infrared signals, coding radio signals, coding acoustic signals. In the latter case, the microphone of a smartphone must be close enough to the speaker of the other smartphone, and vice versa, to avoid the impact of ambient noise.

Whatever the vehicle of the signals, each device thus transmits, in a short-range short distance relationship a nonce to the other device, these exchanged nonces allowing, by encrypting communications using the content of the nonces, each device to ensure that it is the device with which pairing is desired which transmits.

The capture of these nonces being carried out on both sides, the data transfers between devices are then carried out according to at least one of the following methods:

in a first case, the data transfers between the devices are carried out after having (i) generated (at least) a symmetric key from nonces, a key that the devices must keep secret) and (ii) after encrypting with this key the other data to be transmitted: thus, in the optical case, a symmetric key is generated from a combination of said optically readable codes which have been presented on either side. Advantageously, this symmetric key is ephemeral (it is used only for the transmission of data immediately after its generation and is no longer valid thereafter);

in a second case, where the devices each generate a pair of public/private keys, first the public keys are exchanged, accompanied by decryptable signatures by means of these keys, signatures whose content includes a part generated from the nonce captured to prove that the key in question was not transmitted by a MitM, which the respective recipients verify (by decrypting the signature and verifying the part generated from the captured code), then the data transfers of each to each other are done securely by encrypting them (only or in addition) with the other's public key. Here again, advantageously, the validity of the code captured in the signature is ephemeral.

When the devices are able to communicate directly by NFC or by similar means, the keys are exchanged between the devices directly (without going through a network). In the opposite case, the fact that the data is encrypted (by symmetric key or by the respective public keys, as described above) also guarantees the security of the transmission during a transit via non-reliable nodes of the network or via an untrusted intermediate server ("not trusted").

3) Pairing with Biometric Data

In addition to the matching with nonces transmitted in proximity according to point 2) above, it is possible to implement a capture on either side of biometric data.

To describe a particular case, let's take an embodiment with capturing fingerprints: each device captures a fingerprint of the user of the other device (hereinafter called "the other user") as well as his own user (called "user") and the fingerprints collected here allows the generation of the respective canonical (reproducible) forms thereof.

(The calculation of canonical form of fingerprints is known: the researchers Senior and Bolle proposed in 2001 a canonical form on the basis of a representation where all the crests are equally spaced and the crest lines are approximated by "spline curves", the recognition being based on the difference with an average distance between peaks. Other researchers then proposed even more elaborate canonical forms, notably Lee, Choi and Kim in 2002, Lorch, Morguet and Schroeder in 2004, Bhowmick and Bhattacharya in 2004, and Ross and Nadgir in 2008).

In general, it is known how to generate a canonical form for practically all types of biometric data.

According to this aspect, it is provided, from a canonical form of biometric data (of any type) captured on either side by devices of users who meet physically, such as smartphone, laptop, etc., use the general process described above by including within the signed content exchanged data generated according to pre-established rules from the canonical form of biometric data.

Of course, as also described above, biometric data captures can be done in sequence.

The combination of the use of a nonce captured mutually by a nearby transmission mode, leading to a symmetric key and therefore to an ephemeral signature, makes it possible to protect oneself from a "replay" of the exchange of biometric data by a fraudster.

Advantageously, the canonical forms of biometric data transmitted constitute in themselves attributes (which, as described above, are confirmed by both parties and are associated with the respective public keys). Steps for transmitting biometric attributes may also be provided, if necessary, to corroborate the respective biometric data captured.

4) Pairing with Kinematic Data

The approach here is as follows: the devices generate a symmetric encryption key from (in particular) common high definition kinematic data produced during physical contact (shock) between them and not disclosed, this data typically being able to come from an accelerometer or an inertial unit for each device.

Other information (GPS signals, clock signals, optical signals picked up by the camera, acoustic signals picked up by the microphone, NFC signals, etc.) can also be used in combination with kinematic data.

The data (single or combined kinematics) are used to generate an ephemeral symmetric key to encrypt non-common data to be communicated between the devices-such as in particular their respective public keys. Alternatively, the devices first transmit their respective public keys but with a signature of the common data (from the respective accelerometers, etc.) that only they know, thus proving that the public key in question does not come from a MitM, this communication can thus be done without risk notably via a non-trusted network (or non-trusted intermediary server).

More concretely, two terminals (such as modern smartphones, using a given app) having previously generated each a pair of keys are in short physical contact (shock) and their accelerometers measure the shock produced by this contact which causes the same measurement (except for the sign) on both sides, which only these devices know.

This common data, as well as possibly other common data including for example the geolocation and the precise instant of the shock, are used to generate a symmetric encryption key (from common data that only the terminals know).

Non-common data can then be encrypted with this symmetric key locally (for example, at the app level, on each smartphone) and transferred between the two devices (even via a non-trusted network, for example via a server, this server cannot therefore see the data transmitted). In particular, each device can generate a private/public key pair, and the public key, as well as a decryptable signature with it, are encrypted with this symmetric key then transmitted (advantageously, the signed content can include said common data). Here again, advantageously, the validity of this symmetric key is ephemeral.

Alternatively, the two devices each generate a private/public key pair and each public key is transmitted to the other device in the clear (preferably directly by NFC or by another appropriate communication channel), or via a non-trusted network), at the same time as the signature (decryptable by this public key) of the hash of the common data that only they know (to prove that the key in question was not transmitted by an MitM), which the respective recipients verify (by decrypting the signature with the received key and checking the common data). Other non-common data can then be transmitted encrypted with the recipient's public key. Here again, advantageously, the validity of said common data appearing in the signature is ephemeral.

To summarize, either the devices generate a symmetric encryption key from common data of adequate precision produced during physical contact between them and not disclosed, originating from the accelerometer of the device and/or the clock, from the GPS, etc., and use this symmetric key to encrypt uncommon data (which they communicate in an encrypted manner), or the devices transmit their respective public keys with a signature (whose signed content includes) common data, proving as well as not from an MitM.

Other methods of protecting an MitM attack are described in the applications WO2016120826A2 and WO2017122187A2 above and the devices can use them in fallback positions when they are not equipped with the required technical means (screen, camera, fingerprint sensor digital, accelerometer, etc.) or when they only meet virtually (in these applications is thus provided a process called "out-of-band channel", as by oral, to transmit a passphrase and receive the hash in return for within a decryptable signed content with the public key received).

III—Protection of a Group of Devices Against "Sybil Attacks"

Insofar as two devices faithfully execute one of the methods described above (or described in one of the documents WO2016120826A2 and WO2017122187A2), not only their users are protected from an "MitM attack" but also, they can be protected from a "Sybil attack" as will be seen now.

The principle is as follows: if a user U1 meets one by one (individually, physically or through an "out-of-band channel") of other users U2 . . . . Un (i.e. the respective users of the other devices from which his device receives public keys as described so far), then user U1 can ensure that the majority of the keys he receives are actually those of the other users from which he receives them, and are not keys that are part of a profusion keys controlled by an adversary (very definition of the Sybil attack).

In particular, if the majority of these keys are indeed "non-Sybil", the redundant interaction process between WN via mirror WNDs (described in WO2016120826A2 and WO2017122187A2) then guarantees that, if it trusts a single manufacturer or if the respective manufacturers WND mirrors are sufficiently different (see below the "three-level protocol"), the WNs with which it interacts (in particular those with the leaves of the uptree of a transaction from which it receives tag-values such as Bitcoins—the uptree is described in the first part) are reliable, that is to say that they respect their commitments in relation to the executed "smart contracts" (in particular they do not make a "double spend").

To do this, the user must ensure that the other user (whom they meet individually) sends them a single public key (representing his identity) or, at most, a limited number of public keys (representing different identities for this same individual), this restriction being able to depend on the manufacturers of the other devices from which they received keys, (in particular of the manufacturers of the WND mirrors of their WN,) so as to guarantee a diversity of manufacturers (at least of the manufacturers of their WND mirrors), or depend on other factors.

The invention therefore provides that the user's device performs the biometric recognition of the other user (whose device sends them a public key) and only validates (that is to say accepts) only one or a limited number of public keys transmitted by the same other user. During each transmission, to the device of the user, of a public key, by another user, the biometric data of the latter are stored by the device of the user. Thus, the same other user who retransmits a new public key is recognized (by their biometric data which has already been stored during a previous key transmission). Preferably this recognition by the user's device is based on a plurality of biometric data of different types (in parallel) in order to tend to guarantee that when the user of another device is not recognized that it has not yet transmitted any public key to the user's device.

Thus, the methods described above (points 2) and 3)) for capturing random signals and biometric data on both sides, which was simply intended to protect the device of the user from an MitM attack, is now used in addition to restricting the number of public keys transmitted by the same other user (depending in particular, advantageously, on the manufacturers of the devices which have supplied them) to the user's device and thus enables them to protect themselves from a Sybil attack.

Entourage (Neighborhood) of a Node

In addition to its own public key(s) and associated attributes, each device can transmit to another during pairing the associated keys and attributes which it has received itself from third parties. Thus, each device transmits to the other device:

the public keys and associated attributes that this device has received from third-party devices (level 1 entourage (neighborhood));

the public keys and associated attributes that the third-party devices have received from other devices (level 2 entourage);

and so on (level n entourage).

Insofar as the user of the first device is not always sure that the user of the second device has played the game well in terms of those around them (and vice versa), a Sybil attack remains possible. In other words, for the first device, the risk of a Sybil attack is limited when it executes the process described above (to receive public keys from other direct users-level n=0), but the risk that the user of the second device does not apply this process for keys that they themselves would have received from a third party (that is to say their entourage-level n>0)) remains intact.

This risk is mitigated thanks to the above-described pairing methods, because at each level of the entourage (the other indirect users therefore being included), the device of each other user which propagates the keys to it (by keys it is meant here public keys/addresses and associated attributes) guarantees "by construction" that the matching process described above (including biometric recognition and aimed at accepting only a limited number of keys transmitted by the same other user) is correctly executed.

Note that the fact that the attributes include canonical forms of biometric data allows each node to require a limited number of keys throughout the entourage (not only at zero level but at all levels). Indeed, the same user who provides different keys to different devices would have the same biometric attributes for these keys, which would make it possible not to accept these additional keys from the same user when they appear in the same entourage.

This aspect thus allows the devices in question to be trusted in that they each have a secret private key (accessible by the device alone) allowing it to provide a certification of the treatments carried out and of the integrity of these treatments (by providing the hash of the code executed), and to automatically sign the data they provide (with their respective secret keys), the public signature key (allowing the decryption of the signature) being itself signed (certified) by the device manufacturer, and that with each public key previously transmitted by another device, the signature of the latter as well as the identity (the public key) of its manufacturer is also transmitted-a device which receives the entourage of another device thus having information from the manufacturer of this other device and able to verify that the process in question was indeed executed during their transmission. (The WNDs described in the abovementioned PCT applications can thus play the role of such devices).

Thus, the entourage transmitted to the user device by another device includes not only the public keys (of different levels) that the entourage understands, but also the signatures of these public keys by the devices which provided them and their respective certificates (i.e., the signatures, by the respective manufacturers, of public keys making it possible to decrypt said signatures by the devices) which guarantee that it is indeed the process (of biometric recognition with captured codes, making it possible to mitigate the MitM and Sybil attacks) described above which was executed.

Overall, the security of the devices (aimed at making them trusted) is implemented at four levels, described below under the headings (i) CMMU, (ii) Anti-tampering protection of the chip (resulting in Logs), (iii) NTES, (iv) the fourth level being that already described above (under the title "Mitigation of the risk of Sybil attack by biometric recognition", this section referring to the previous sections).

As described below at level three ("NTES"), the "device" described so far is an assembly including a WND chip and peripheral components. The final manufacturer of the device is thus said assembler, and said signatures and certificates provided by a device include not only the signature of the WND chip and the certificate of its manufacturer but also possible signatures (and certificates) of peripheral components (which are in the device), as well as the NTES and the signature of the NTES provided by the final assembler.

IV—Sensor Block

Here is offered additional security for data processing systems, more particularly systems on a chip (SoC).

Known attacks against data processing systems include various kinds of Fault Attacks, such as by varying the clock speed or by sending photons to the transistors to deduce information therefrom.

PUFs (physical unclonable function) are security mechanisms based on permanent physical phenomena at the time of the system "Power On". However, a "power supply attack" is possible: when sensitive information such as a cryptographic key is in memory, and the power is cut before it is erased, there are ways to detect it.

It is provided here to implement a detection of such attacks in the chip itself, by means of temperature, light, voltage, clock frequency, etc. sensors, which must "continuously" notify the proper functioning of the chip. Thus, the messages sent by the chip are only valid on proof, sent by an authority, which advantageously can be decentralized, of non-detection of an attack, this proof being generated on the basis of the non-interruption of the flow of these notifications.

1) General Framework

A SoC chip incorporates a "Wallet Node" (WN) described in application WO2016120826A2 or WO20171221287A2, which contains a secret private key.

A chip manufacturer, on behalf of an authority, signs the public key of the WN (or an address derived from it).

Each message sent by the chip (WM "Wallet Message" includes the hash of the WP program supposed to be executed by the recipient WN, this hash being noted #WP.

2) Detection Blocks

A plurality of SB (Sensor Blocks) control a processing block to secure the SoC chip, here a WN, also control each other and generate reports (and Logs) of proper functioning or alert sent to entities that are under the authority of the authority controlling the dissemination of SoCs.

Each SB is implemented using a combination of different technologies, so that the attacker cannot hack more than one SB at a time in a given time interval.

For example, one of the SBs is made in MCML technology (MOS Current Mode Logic) while one is made in CMOS technology, possibly with random jitter on clock signals ("random jitter on clock signals" in English terminology) to add noise against lateral attacks (see for example US20110285421A1, US20110285420A1 or US20110260749A1 and citing or cited documents).

Each block monitors at least one parameter among, for example, the temperature, the light, the voltage, the clock frequency of the circuit.

SBs regularly send notifications to entities that are under the authority of the authority. These notifications can be performance reports signed by each of the SBs, and/or logs of these reports. Logs notification (chronological successions of reports) makes it possible to send notifications less frequently and therefore to tolerate temporary unavailability of the means of communication between the WN and the recipient entity.

3) Sequencing

Periodically, each SB of a WN generates its report (of correct operation or of alert in the event of malfunction), signs it with a private key stored in the SB, and notifies this report to the other SB (or to each other SB) from the same WN. In the case of several SBs, this transmission can be carried out in a star or step by step in a circular manner.

A second SB to which a first SB has notified a report countersigns it (in case it confirms it), adds it to its log and returns it to the first SB (or in a circular manner, step by step until reaching the first).

Said first SB then replaces in the log the report which he had recorded with his signature alone and originally transmitted.

Periodically (or as soon as possible) the logs are sent to said entities under the supervision of the authority.

Said entities return (signed) certificates of correct operation covering a certain time interval in the future for a given WN (identified by its public key or an address derived from it, itself certified by the manufacturer under the supervision of a authority as mentioned at the beginning).

Each WM message sent is only valid if it includes such a certificate of correct operation, and only during the time interval given in this certificate.

Alternatively, a WN can request a certificate of good performance when it has to send a particular WM.

Advantageously, said entities which are under the supervision of an authority are delegated entities (delegated by the authority in question) and thus form a plurality of delegated entities capable of certifying WNs. In a certificate of good functioning, the delegated entity communicates the signature, by the authority, of its own public key (the latter making it possible to decrypt its certificate).

According to another variant, the WNs connected to the network can play the role of said entities, thus offering a p2p solution for mutual (network) control of the WNs.

Finally, separating the Sensor Blocks SB from the Wallet Node WN part in the SoC chip is advantageous for preserving the performance of the WN.

V—3-Level Protocol

1) General Principle

The different approaches described in this specification can be combined.

First, the envelope signature is initially communicated by a device to its mirror devices (typically to the mirror WNDs for the WN executed in the case of an implementation according to WO2016120826A2 and/or WO2017122187A2), and these devices mutually verify their signature envelope.

In addition, these mirror devices mutually verify their ES envelope signatures on each interaction.

More precisely, the current ES and the various logs (ES log, sensor block log, etc.) of a given device are transmitted with each message (such as WM) sent, and therefore communicated to the recipient device.

A mirror device is therefore able to verify the log and also verify the current ES accompanying the WM by comparing it with the ES received initially.

The 3-level protocol is as follows:

if the verification at the level of the current ES fails, then from this moment all the WMs supplied by this WND are considered as invalid and the device implementing this WND) is blacklisted;

if the logs (Sensor Blocks, BIST (Built-In Self Test) typically used to test the secret key of an SoC), etc.) show that the WND has been defrauded, then the WND is blacklisted;

if the verification of the ES and the verification of the logs show that the WND has never been defrauded, but that the outputs of the mirrors show an inconsistency with the outputs of the WND, then it is the manufacturer of the WND in question who is blacklisted.

The fact that a WND or a manufacturer of WND is blacklisted is propagated in the network step by step (from node to node) by an appropriate propagation mechanism based for example on dedicated WMs.

2) Weighting of Mirrors by Manufacturers

When establishing a set of mirrors, other devices are selected as mirrors by a given device according to their respective manufacturers. Manufacturers are weighted according to their active users, as described in the first part. At each level in the entourage, the device aims to maximize the diversity of manufacturers while balancing them). In addition, when traversing the entourage in an increasing direction, a device has the objective of maximizing the diversity of the manufacturers of the other devices at each level of the entourage, compared to the manufacturers of the other corresponding devices of lower level which had communicated.

VI—Other Implementations and Combinations

Are included by reference in this memorandum not only the published documents WO2016120826A2, WO2017122187A2 and US20170091750A1, but also the unpublished application U.S. 62/400,174 filed on Sep. 27, 2016 and U.S. 62/462,390 filed on Feb. 23, 2017, all in the name of the present applicant.

VII—Applications

1) Secure Transactions

Account unit transfer transactions, such as cryptocurrencies, or commitment transactions such as risk hedging commitments (see documents WO2016120826A2, WO2017122187A2 or even US20170091750A1 on behalf of the Applicant).

2) Authentic and Time-Stamped Photos, Videos or Sound Recordings

The goal here is to prove a disputed fact in the real world by providing a time-stamped and geolocated photo, by also proving that the means to generate this photo—in this case the camera and GPS components-were not replaced or moved (relative to the position of the WND), which amounts to providing proof that the device envelope has remained intact. Another example: if in a "smart contract" it involves triggering a payment when a lock opens, which is detected by a sensor component within the device which here is part of the lock in question, then it can also be provided proof that the lock position sensor component in question has not been replaced or moved, which also amounts to providing proof that the device's NTES has remained intact.

The invention claimed is:

1. A portable terminal comprising:
   a display screen and a camera, all housed in a rigid envelope forming part of the terminal, the rigid envelope comprising:
   a first optical coupling with a region of the display screen,
   a second optical coupling with a region of the camera, and
   at least one optical channel extending along the rigid envelope between said first coupling and said second coupling,
   the rigid envelope including a first internal reflective surface and a second internal reflective surface;
   wherein the rigid envelope captures a signal transmitted by said display screen and reflects said signal via said first internal reflective surface onto said at least one optical channel, and reflects said signal via said second internal reflective surface to convey said signal and restore said signal at said camera,
   the terminal further comprising an envelope breach detector for detecting a breach of said rigid envelope in response to an alteration of the restored signal relative to the transmitted signal, whereby the rigid envelope plays the role of a secure anti-fraud envelope.

2. The terminal of claim 1, wherein the rigid envelope incorporates a plurality of channels capable of conveying the signal, said plurality of channels being distributed in the rigid envelope.

3. The terminal of claim 1 or 2, wherein the envelope breach detector is able to process the restored signal and generate an envelope signature.

\* \* \* \* \*